US009809740B2

(12) United States Patent
Chakraborty et al.

(10) Patent No.: US 9,809,740 B2
(45) Date of Patent: Nov. 7, 2017

(54) NANOPARTICLE MODIFIED FLUIDS AND METHODS OF MANUFACTURE THEREOF

(71) Applicants: Soma Chakraborty, Houston, TX (US); Michael H. Johnson, Katy, TX (US)

(72) Inventors: Soma Chakraborty, Houston, TX (US); Michael H. Johnson, Katy, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 36 days.

(21) Appl. No.: 14/934,732

(22) Filed: Nov. 6, 2015

(65) Prior Publication Data

US 2016/0060503 A1 Mar. 3, 2016

Related U.S. Application Data

(63) Continuation-in-part of application No. 13/648,881, filed on Oct. 10, 2012, now abandoned.

(51) Int. Cl.

| | | |
|---|---|---|
| C09K 8/42 | (2006.01) |
| C09K 8/58 | (2006.01) |
| E21B 43/267 | (2006.01) |
| B82Y 30/00 | (2011.01) |
| C09K 8/03 | (2006.01) |
| C09K 8/66 | (2006.01) |
| C09K 8/70 | (2006.01) |
| C09K 8/84 | (2006.01) |
| C09K 8/92 | (2006.01) |

(52) U.S. Cl.
CPC ............ *C09K 8/58* (2013.01); *B82Y 30/00* (2013.01); *C09K 8/032* (2013.01); *E21B 43/267* (2013.01); *C09K 8/665* (2013.01); *C09K 8/70* (2013.01); *C09K 8/845* (2013.01); *C09K 8/92* (2013.01); *C09K 2208/10* (2013.01)

(58) Field of Classification Search
CPC ........ C09K 8/80; C09K 2208/10; C09K 8/03; C09K 8/805; C09K 8/516; C09K 8/05; C09K 8/36; C09K 8/56; C09K 8/572; C09K 2208/18; C09K 8/70; C09K 8/82; C09K 8/42; C09K 8/467; C09K 8/52; C09K 8/524; C09K 8/62; C09K 8/72; C09K 11/025; C09K 11/0883; C09K 11/70; C09K 11/703; C09K 11/706; C09K 2208/22; C09K 8/035; C09K 8/44; C09K 8/502; C09K 8/58; C09K 8/592; C09K 8/92; C09K 2208/08; C09K 8/032; C09K 8/536; C09K 8/665; E21B 43/04; E21B 43/267; E21B 43/26; E21B 7/00; E21B 21/00; E21B 36/00; E21B 36/001; E21B 43/08; E21B 37/06; E21B 41/0057; E21B 41/02

See application file for complete search history.

(56) References Cited

U.S. PATENT DOCUMENTS

| | | |
|---|---|---|
| 4,371,447 A | 2/1983 | Webb et al. |
| 4,565,684 A | 1/1986 | Tibbetts et al. |
| 4,572,813 A | 2/1986 | Arakawa |
| 4,663,230 A | 5/1987 | Tennent |
| 4,816,289 A | 3/1989 | Komatsu et al. |
| 4,876,078 A | 10/1989 | Arakawa et al. |
| 4,919,179 A | 4/1990 | Chattopadhyay |
| 5,024,818 A | 6/1991 | Tibbetts et al. |
| 5,165,909 A | 11/1992 | Tennent et al. |
| 5,589,152 A | 12/1996 | Tennent et al. |
| 5,591,312 A | 1/1997 | Smalley |
| 5,591,382 A | 1/1997 | Nahass et al. |
| 5,591,832 A | 1/1997 | Koshijima et al. |
| 5,641,455 A | 6/1997 | Rosenlund et al. |
| 5,830,326 A | 11/1998 | Iijima |
| 5,919,429 A | 7/1999 | Tanaka et al. |
| 6,183,714 B1 | 2/2001 | Smalley et al. |
| 7,550,129 B2 | 6/2009 | Baker et al. |
| 7,592,389 B2 | 9/2009 | Baker et al. |
| 7,981,845 B2 | 7/2011 | Samuel et al. |
| 2003/0104949 A1* | 6/2003 | Myers ............... C04B 40/0633 507/100 |

(Continued)

FOREIGN PATENT DOCUMENTS

EP 0198558 A2 10/1986

OTHER PUBLICATIONS

"Directed Self-Assembly of Functionalized Silica Nanoparticles on Molecular Printboards through Multivalent Supramolecular Interactions," Langmuir, vol. 20(26), pp. 11756-11762, 2004.*
Hummers, et al., "Preparation of graphitic oxide." Chem. Soc. Mar. 20, 1958, 80, 1339. (1 pg).
International Search Report and Written Opinion, International Application No. PCT/US2013/058690; dated Nov. 21, 2013; Korean Intellectual Property Office; International Search Report 5 pages, Written Opinion 6 pages.
Kovtyukhova et al., :Layer-by-layer assembly of ultrathin composite films from micron-sized graphite oxide sheets and polycations. Chem. Mater. 1999, 11, 771-778 771.
Schniepp et al., "Functionalized single graphene sheets derived from splitting graphite oxide." Phys. Chem. B 2006, 110, 8535.

*Primary Examiner* — Kumar R Bhushan
(74) *Attorney, Agent, or Firm* — Cantor Colburn LLP

(57) ABSTRACT

Disclosed herein is a nanoparticle modified fluid that includes nanoparticles that are surface modified to increase a viscosity of the nanoparticle modified fluid and that have at least one dimension that is less than or equal to about 50 nanometers; nanoparticles that are surface modified to increase a viscosity of the nanoparticle modified fluid and that have at least one dimension that is less than or equal to about 70 nanometers; and a liquid carrier; wherein the nanoparticle modified fluid exhibits a viscosity above that of a comparative nanoparticle modified fluid that contains the same nanoparticles but whose surfaces are not modified, when both nanoparticle modified fluids are tested at the same shear rate and temperature.

11 Claims, 1 Drawing Sheet

(56) References Cited

U.S. PATENT DOCUMENTS

| | | | |
|---|---|---|---|
| 2003/0220204 A1* | 11/2003 | Baran, Jr. | B82Y 30/00 |
| | | | 507/200 |
| 2007/0092432 A1* | 4/2007 | Prud'Homme | C01B 31/043 |
| | | | 423/448 |
| 2008/0220991 A1 | 9/2008 | Slay et al. | |
| 2009/0065209 A1 | 3/2009 | Huang et al. | |
| 2009/0312204 A1* | 12/2009 | Huang | C09K 8/58 |
| | | | 507/271 |
| 2010/0243236 A1 | 9/2010 | Koons | |
| 2011/0000672 A1* | 1/2011 | Huang | C09K 8/032 |
| | | | 166/308.1 |
| 2011/0059871 A1 | 3/2011 | Tour et al. | |
| 2011/0237467 A1* | 9/2011 | Cornette | C09K 8/52 |
| | | | 507/219 |
| 2011/0290491 A1* | 12/2011 | Gupta | C09K 8/665 |
| | | | 166/305.1 |
| 2012/0015852 A1 | 1/2012 | Quintero et al. | |
| 2012/0199357 A1 | 8/2012 | Seth et al. | |
| 2012/0245058 A1* | 9/2012 | Monteiro | C09K 8/032 |
| | | | 507/110 |
| 2013/0341030 A1* | 12/2013 | Brannon | C09K 8/60 |
| | | | 166/308.2 |
| 2014/0096964 A1* | 4/2014 | Chakraborty | B82Y 30/00 |
| | | | 166/279 |

* cited by examiner

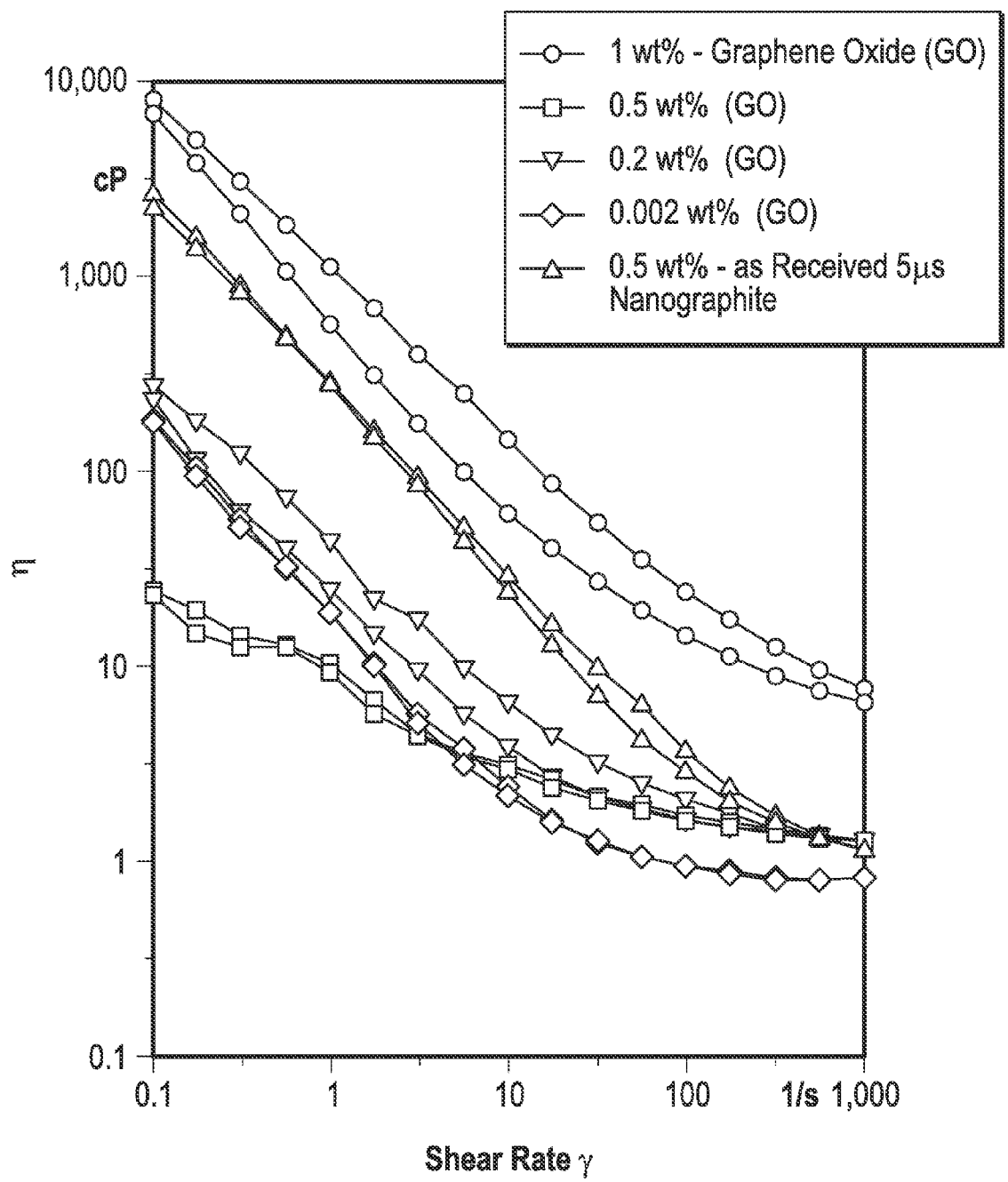

NANOPARTICLE MODIFIED FLUIDS AND METHODS OF MANUFACTURE THEREOF

CROSS REFERENCE TO RELATED APPLICATIONS

This application is a continuation-in-part application that claims priority to U.S. application Ser. No. 13/648,881, filed on Oct. 10, 2012, the entire contents of which are hereby incorporated by reference.

BACKGROUND

Disclosed herein are nanoparticle modified fluids and methods of manufacture thereof. In particular disclosed herein are nanoparticle modified fluids that are used for enhanced oil recovery from subterranean hydrocarbon formations.

Hydraulic fracturing is a common stimulation technique used to enhance production of fluids from subterranean hydrocarbon formations. Hydraulic fracturing is used to stimulate low permeability formations where recovery efficiency is limited.

During hydraulic fracturing, a fracturing fluid is pumped at high pressures and high rates into a wellbore penetrating a subterranean hydrocarbon formation to initiate and propagate a fracture in the formation. Well productivity depends on the ability of the fracture to conduct fluids from the formation to the wellbore. The treatment design generally requires the fluid to reach maximum viscosity as it enters the fracture which affects the fracture length and width. The requisite viscosity is generally obtained by the gelation of viscosifying polymers and/or surfactants in the fracturing fluid. The gelled fluid is accompanied by a proppant which results in placement of the proppant within the produced fracture.

Once the fracture is initiated, subsequent stages of fracturing fluid containing proppant are pumped into the created fracture. The fracture generally continues to grow during pumping and the proppant remains in the fracture in the form of a permeable "pack" that serves to "prop" the fracture open. Once the treatment is completed, the fracture closes onto the proppants which maintain the fracture open, providing a highly conductive pathway for hydrocarbons and/or other formation fluids to flow into the wellbore.

Filtrate from the fracturing fluid ultimately "leaks off" into the surrounding formation leaving a filter cake comprised of fluid additives. Such additives, including the viscosifying polymers and/or surfactants used to provide fluid viscosity, are typically too large to penetrate the permeable matrix of the formation. Recovery of the fracturing fluid is therefore an important aspect to the success of the fracturing treatment.

Recovery of the fracturing fluid is normally accomplished by reducing the viscosity of the fracturing fluid (breaking) such that the fracturing fluid flows naturally from the formation under the influence of formation fluids and pressure. Conventional oxidative breakers react rapidly at elevated temperatures, potentially leading to catastrophic loss of proppant transport. Encapsulated oxidative breakers have experienced limited utility at elevated temperatures due to a tendency to release prematurely or to have been rendered ineffective through payload self-degradation prior to release. Thus, the use of breakers in fracturing fluids at elevated temperatures, i.e., above about 120-130° F., typically compromises proppant transport and desired fracture conductivity, the latter being measured in terms of effective propped fracture length. Improvements in hydraulic fracturing techniques are required in order to increase the effective propped fracture length and thereby improve stimulation efficiency and well productivity.

Recently, fluids (such as water, salt brine and slickwater) which do not contain a viscosifying polymer have been used in the stimulation of tight gas reservoirs as hydraulic fracturing fluids. Such fluids are much cheaper than conventional fracturing fluids containing a viscosifying polymer and/or gelled or gellable surfactant. In addition, such fluids introduce less damage into the formation in light of the absence of a viscosifying polymer and/or surfactant in the fluid.

The inherent properties of fluids not containing a viscosifying polymer, such as slickwater, present however several difficulties. Foremost, such fluids provide poor proppant transport as well as poor fluid efficiency (leakoff control). Further, the low viscosity of fluids like water, salt brine and slickwater makes it difficult, if not impossible, to generate the desired fracture width. This affects the requisite conductivity of the propped fracture as proppant placement in the fracture is often not possible.

It is therefore desirable to use fluids that do not contain a viscosifying polymer, but which can provide proppant transport and which can also facilitate the extraction of hydrocarbons from the subterranean formation.

SUMMARY

Disclosed herein is a nanoparticle modified fluid that comprises nanoparticles that are surface modified to increase a viscosity of the nanoparticle modified fluid and that have at least one dimension that is less than or equal to 50 nanometers; nanoparticles that are surface modified to increase a viscosity of the nanoparticle modified fluid and that have at least one dimension that is less than or equal to 70 nanometers; and a liquid carrier; wherein the nanoparticle modified fluid exhibits a viscosity above that of a comparative nanoparticle modified fluid that contains the same nanoparticles but whose surfaces are not modified, when both nanoparticle modified fluids are tested at the same shear rate and temperature.

Disclosed herein too is a method of making a nanoparticle modified fluid comprising mixing nanoparticles that are surface modified to increase a viscosity of the nanoparticle modified fluid and that have at least one dimension that is less than or equal to about 50 nanometers with nanoparticles that are surface modified to increase a viscosity of the nanoparticle modified fluid and that have at least one dimension that is less than or equal to about 70 nanometers to form a nanoparticle mixture; and mixing the nanoparticle mixture with a liquid carrier to form the nanoparticle modified fluid, wherein the nanoparticle modified fluid exhibits a viscosity above that of a comparative nanoparticle modified fluid that contains the same nanoparticles but whose surfaces are not modified, when both nanoparticle modified fluids are tested at the same shear rate and temperature.

Disclosed herein too is a method of using a nanoparticle modified fluid comprising injecting into a subterranean hydrocarbon formation the nanoparticle modified fluid, comprising nanoparticles that are surface modified to increase a viscosity of the nanoparticle modified fluid and that have at least one dimension that is less than or equal to about 50 nanometers and nanoparticles that are surface modified to increase a viscosity of the nanoparticle modified fluid and that have at least one dimension that is less than or equal to about 70 nanometers; contacting the subterranean hydrocarbon formation with the nanoparticle modified fluid; where the reduction in flow rate of the nanoparticle modified fluid as it contacts the formation promotes an increase in the viscosity of the nanoparticle modified fluid to a point of gelation; and injecting additional nanoparticle modified fluid into channels formed in the gelled nanoparticle modified fluid in the subterranean hydrocarbon formation.

BRIEF DESCRIPTION OF THE FIGURES

FIG. 1 is a graph depicting the viscosity versus the shear rate for a nanoparticle modified fluid.

DETAILED DESCRIPTION

Disclosed herein is a nanoparticle modified fluid that can be used for enhanced oil recovery from subterranean hydrocarbon formations. The nanoparticle modified fluids comprise a liquid carrier and surface modified nanoparticles. In one embodiment, the liquid carrier is water, sea water or brine, while the surface modified nanoparticles are carbonaceous nanoparticles, metal oxide nanoparticles, metal nanoparticles or polyhedral oligomeric silsesquioxanes, or the like, or a combination comprising at least one of the foregoing surface modified nanoparticles.

The nanoparticles have their surfaces modified so that the nanoparticle modified fluid displays a unique combination of shear sensitivity and surfactancy. By varying the surface groups on the nanoparticles, the nanoparticle modified fluids can be designed so that when it contacts the zone having higher permeability it will undergo gelation and plug the zone thus channelizing the injection fluid (i.e., additional nanoparticle modified fluid) through the lesser permeable zones. By choosing the proper surface groups the nanoparticles can have surfactant like properties. The resultant nano-enhanced injection fluid when pumped into the hydrocarbon formation will generate unique capillary forces that will help in enhanced oil recovery. The methods described herein have various benefits in improving the recovery of hydrocarbon fluids from an organic-rich rock formation such as a formation containing solid hydrocarbons or heavy hydrocarbons. In various embodiments, such benefits may include increased production of hydrocarbon fluids from an organic-rich rock formation, and providing a source of electrical energy for the recovery operation, such as an oil shale production operation.

The liquid carrier used in the nanoparticle modified fluid can be water. The water can comprise distilled water, salt water or brine. In one embodiment, the water will be a major component by weight of the nanoparticle modified fluid. The water can be potable or non-potable water. The water can be brackish or contain other materials typical of sources of water found in or near oil fields. For example, it is possible to use fresh water, brine, or even water to which any salt, such as an alkali metal or alkali earth metal salt ($NaCO_3$, NaCl, KCl, and the like) has been added. The liquid carrier is present in an amount of at least about 80% by weight, based on the total weight of the nanoparticle modified fluid. Specific examples of the amount of liquid carrier include at least about 80%, 85%, 90%, and 95% by weight, based on the total weight of the nanoparticle modified fluid.

An exemplary liquid carrier is brine. Brine may be used to modify the density as well as to moderate the diffusion rate of the nanoparticle modified fluid. The brine can be, for example, seawater, produced water, completion brine, or a combination thereof. The properties of the brine can depend on the identity and components of the brine. Seawater, as an example, contains numerous constituents such as sulfate, bromine, and trace metals, in addition to halide-containing salts. On the other hand, produced water can be water extracted from a production reservoir (e.g., hydrocarbon reservoir), produced from the ground. Produced water is also referred to as reservoir brine and often contains many components such as barium, strontium, and heavy metals as well as halide salts. In addition to the naturally occurring brines (seawater and produced water), completion brine can be synthesized from fresh water by the addition of various salts such as NaCl, $CaCl_2$, or KCl to increase the density of the brine to a value such as 10.6 pounds per gallon of $CaCl_2$ brine. Completion brines can provide a hydrostatic pressure optimized to counter the reservoir pressure downhole. The above brines can be modified to include an additional salt. In an embodiment, the additional salt included in the brine is NaCl, KCl, NaBr, $MgCl_2$, $CaCl_2$, $CaBr_2$, $ZnBr_2$, $NH_4Cl$, sodium formate, potassium formate, cesium formate, and the like. The salt can be present in the brine in an amount from about 0.5 wt. % to about 50 wt. %, specifically about 1 wt. % to about 40 wt. %, and more specifically about 1 wt. % to about 25 wt. %, based on the weight of the brine.

In addition to brine, the nanoparticle modified fluid may also optionally contain a solvent, which is also referred to as a mutual solvent because the solvent is miscible with more than one class of liquids. In particular, a mutual solvent can be soluble in hydrophobic and hydrophilic liquids, for example, hydrocarbon fluids and aqueous solutions. Suitable mutual solvents include but are not limited to substituted and unsubstituted glycols of the formula $R^1O(CH_2CHR^2O)_nR^3$, wherein $R^1$, $R^2$, and $R^3$ are independently hydrogen, alkyl group, aryl group, and acetyl group, and n is about 1 to about 10. In an embodiment, the alkyl group, aryl group, and acetyl group have 1 to about 6 carbon atoms, specifically 1 to about 4 carbon atoms; and more specifically 1 to about 2 carbon atoms; n is 1 to about 10, specifically 1 to about 6, and more specifically 1 to about 3.

An example of a suitable mutual solvent is a substituted or unsubstituted glycol. Examples of substituted and unsubstituted glycols include glycols such as ethylene glycol, propylene glycol, butylene glycol, hexylene glycol, dipropylene glycol, diethylene glycol, tripropylene glycol, triethylene glycol, and poly glycols; glycol ethers such as ethylene glycol monomethyl ether (EGMME), ethylene glycol monoethyl ether (EGMEE), ethylene glycol monopropyl ether (EGMPE), ethylene glycol monoisopropyl ether, ethylene glycol monobutyl ether (EGMBE), ethylene glycol monophenyl ether, ethylene glycol monobenzyl ether, diethylene glycol monomethyl ether (DEGMME), diethylene glycol monoethyl ether (DEGMEE), diethylene glycol mono-n-butyl ether (DEGMBE), and dipropylene glycol monomethyl ether (DPGMEE); dialkyl ethers such as ethylene glycol dimethyl ether (EGDME), ethylene glycol diethyl ether (EGDEE), and ethylene glycol dibutyl ether (EGDBE); and esters such as ethylene glycol methyl ether acetate (EGMEA), ethylene glycol monethyl ether acetate (EGMEEA), and ethylene glycol monobutyl ether acetate (EGMBEA). Combination comprising at least one of the foregoing can be used.

In an embodiment, the solvent is a glycol ether wherein $R^1$ and $R^2$ are both hydrogen; $R^3$ is an alkyl group including methyl, ethyl, propyl, isopropyl, and butyl groups; and n is 1. In another embodiment, the solvent is specifically ethylene glycol monomethyl ether (EGMME), and more specifically ethylene glycol monobutyl ether (EGMBE). Such solvents are available from, for example, Union Carbide Corporation.

Other suitable solvents include amides of the formula $R^4CONR^5R^6$, wherein $R^4$, $R^5$, and $R^6$ are independently a C1-C5 alkyl group or C1-C5 alkenyl group, and any two of $R^4$-$R^6$ can cyclize together to form a cycle as in 1-methyl-2-pyrrolidinone. Examples of amide solvents include but are not limited to N,N-dimethylformamide, N,N-diethylformamide, N,N-dimethylacetamide, N,N-diethylacetamide, N,N-dimethylpropionamide, N,N-dimethylbutyramide, 1-methyl-2-pyrrolidinone, and 1-ethyl-2-pyrrolidinone. Such amides are commercially available from, for example, Sigma-Aldrich.

Another example of a mutual solvent is an alcohol. The alcohol can be linear or branched. In an embodiment the alcohol is a C1-C10 alcohol, including monohydric and polyhydric alcohols. Examples of the monohydric alcohol include methanol, ethanol, n-propanol, isopropanol, n-butanol, 2-butanol, isobutanol, tert-butanol, n-pentanol, isopentanol, 2-pentanol, hexanol, octanol, isooctanol, cyclohexanol. 2-methyl-1-butanol, 2-methyl-1-pentanol, 3-methyl-2-butanol, 2-ethylhexanol. Other alcohols include polyhydric alcohols such as diols, triols, and polyols, including ethylene glycol, propylene glycol, 1,3-propanediol, 1,4-butanediol, 1,2,4-butanetriol, glycerin, erythritol, and the like. Combinations of the foregoing mutual solvents can be used.

The liquid carrier is used in the nanoparticle modified fluid in amounts of about 90 wt % (weight percent) to about 99.9 wt %, specifically about 93 to about 98 wt %, and more specifically about 95 to about 97 wt %, based on the total weight of the nanoparticle modified fluid.

As noted above, the nanoparticle modified fluid contains nanoparticles. Nanoparticles are particles that have at least one dimension that is less than 100 nanometers. In an embodiment, the nanoparticles comprise nanoparticles having at least one dimension that is less than or equal to about 50 nanometers and nanoparticles having at least one dimension that is less than or equal to about 70 nanometers. The nanoparticles can include spherical or ellipsoidal nanoparticles, nanorods, nanotubes, nanowhiskers, nanoribbons, nanosheets, nanoplatelets, or the like, or a combination thereof. In one embodiment, the nanorods, nanotubes, nanowhiskers, nanoribbons, and nanosheets can have branches if desired. In another embodiment, the nanotubes, nanowhiskers, nanoribbons, and nanosheets can be connected to one another by covalent bonds or by ionic bonds (i.e., a branch can connect a first nanotube with a second nanotube or with another first nanorod, first nanoribbon, or the like). The nanoparticles are generally in the form of agglomerates prior to being surface modified.

The nanoparticles have a high aspect ratio. The aspect ratio is greater than 5, specifically greater than 50, and more specifically greater than 100. The aspect ratio is defined as the length of the nanoparticle divided by the narrowest cross-sectional distance. The length of the nanoparticle is the largest dimension of the nanoparticle and is taken as the distance between a first end and a second end (the second end being opposed to the first end) of the nanoparticle when the nanoparticle is completely stretched out. The narrowest cross-sectional distance is measured along the cross-sectional area of the nanoparticle and is generally measured along a direction that is perpendicular to the direction along which the length of the nanoparticle is measured. For example, a nanoribbon having a thickness of 5 to 50 nanometers, a width of 50 to 500 nanometers and a length of 10,000 nanometers has an aspect ratio of 10,000 (the largest dimension) divided by 5 (the smallest dimension), which is equal to 2,000.

When branched nanoparticles are used as the amplification medium, the aspect ratio is calculated as being the largest dimension of the particular nanoparticle divided by the smallest dimension of a particular stem or branch of the nanoparticle.

The nanoparticles have a surface area of about 120 to about 2,000 square meters per gram ($m^2/gm$), specifically about 300 to about 1,900 $m^2/gm$, and more specifically about 400 to about 1,800 $m^2/gm$.

In one embodiment, the nanoparticles can be carbonaceous. Examples of carbonaceous nanoparticles are fullerenes, carbon nanotubes, metal coated carbon nanotubes, graphite nanoparticles, graphene nanoparticles, or the like, or a combination comprising at least one of the foregoing nanoparticles. In another embodiment, the nanoparticles can be carbonaceous nanoparticles mixed with nano-clay and/or metal oxide nanoparticles and/or ceramic nanoparticles.

Graphitic or partially graphitic carbon nanotubes can be in the form of fullerenes (buckeyeballs), single wall carbon nanotubes, double wall carbon nanotubes, or multiwall carbon nanotubes. The fullerenes, single wall carbon nanotubes, double wall carbon nanotubes, or multiwall carbon nanotubes can be grown from carbon vapors and can have a tree-ring, fishbone, or graphene platelet type structure. The diameter of the single wall fullerenes and carbon nanotubes are about 0.7 to 2.6 nanometers, while the diameters of the multiwall fullerenes and carbon nanotubes are about 3.5 to 2,000 nanometers.

The fullerenes and carbon nanotubes may or may not contain embedded catalyst particles utilized in their production. Representative fullerenes and carbon nanotubes are described in, for example, U.S. Pat. Nos. 4,565,684 and 5,024,818 to Tibbetts et al.; U.S. Pat. No. 4,572,813 to Arakawa; U.S. Pat. Nos. 4,663,230 and 5,165,909 to Tennent; U.S. Pat. No. 4,816,289 to Komatsu et al.; U.S. Pat. No. 4,876,078 to Arakawa et al.; U.S. Pat. No. 5,589,152 to Tennent et al.; U.S. Pat. No. 5,591,382 to Nahass et al., U.S. Pat. Nos. 7,592,389 and 7,550,129 to Baker et al., U.S. Pat. No. 6,183,714 to Smalley et al, U.S. Pat. No. 5,591,312 to Smalley, U.S. Pat. No. 5,641,455 to Ebbesen et al, U.S. Pat. No. 5,830,326 to Iijima et al, U.S. Pat. No. 5,591,832 to Tanaka et al, U.S. Pat. No. 5,919,429 to Tanaka et al. and EP 198 558 to Geus, the entire contents of which are hereby incorporated by reference.

In one embodiment, the fullerenes and carbon nanotubes and graphene can be coated with metals. Suitable metals are transition metals, alkali metals, alkaline earth metals, or combinations thereof. Examples of suitable metals are iron, cobalt, nickel, aluminum, copper, titanium, chromium, vanadium, molybdenum, lead, platinum, rhodium, gold, silver, zinc, cadmium, or the like, or a combination comprising at least one of the foregoing metals.

Other nanoparticles that can be added to the nanoparticle modified fluid include metal oxide nanoparticles. The metal oxide nanoparticles can comprise zinc oxide (ZnO) nanoribbons, tin dioxide ($TiO_2$) nanoribbons, indium (III) oxide ($In_2O_3$) nanowires, cadmium oxide (CdO) nanoribbons, gallium (III) oxide ($Ga_2O_3$) nanoribbons, tungsten oxide ($WO_3$) nanowires, titanium dioxide ($TiO_2$) nanotubes, silicon dioxide spherical or ellipsoidal nanoparticles, aluminum oxide spherical or ellipsoidal nanoparticles, zirconium oxide spherical or ellipsoidal nanoparticles, titanium dioxide spherical or ellipsoidal nanoparticles, or the like, or a combination thereof. While the foregoing metal oxide nanoparticles are listed in one form, other commercially available forms having the same chemical composition can be used. For example, while the zinc oxide above is listed as being in the form of nanoribbons, it can also be used in the form of nanotubes, nanowires, nanorods or nanosheets, if such shapes are commercially available.

Another class of nanoparticles that can be added to the nanoparticle modified fluid are polyhedral oligomeric silsesquioxanes (POSS), nano-clay, boron nitride and silica derivatives. POSS has the generic formula $(RSiO_{1.5})_n$, wherein R is an organic moiety and n is 6, 8, 10, 12, or higher. These molecules have rigid, thermally stable silicon-oxygen frameworks with an oxygen to silicon ratio of 1.5, and covalently-bound organic groups that provide an organic outer layer comprising, for example, hydrocarbons (e.g., phenyl, isooctyl, cyclohexyl, cyclopentyl, isobutyl, or other hydrocarbons), as well as functional groups such as ester, epoxy, acrylate, or other functional groups. POSS generally have surface areas greater than 400 square meters per gram ($m^2$/gm).

The nanoparticles utilized in the composition may also be derivatized with functional groups to improve compatibility and facilitate the mixing with the liquid carrier. The nanoparticles are modified with functional groups that facilitate their dispersal in the liquid carrier and resist phase separation from the liquid carrier. The fullerenes and the nanotubes may be functionalized on either a sidewall, a hemispherical endcap or on both the side wall as well as the hemispherical endcap, while the other nanoparticles (the nanowhiskers, nanoribbons, nanosheets, nanorods, and the like) may be functionalized on their ends or on their sidewalls.

Functionalized carbonaceous nanoparticles having the formula (I)

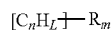  (I)

wherein n is an integer, L is a number less than 0.1n, m is a number less than 0.5n, and wherein each of R is the same and is selected from $SO_3H$, COOH, $NH_2$, OH, R'CHOH, CHO, CN, COCl, COSH, SH, COOR', SR', $SiR_3$', Si—$(OR')_y$—$R'_{(3-y)}$, R'', $AlR_2$', halide, ethylenically unsaturated functionalities, epoxide functionalities, or the like, wherein y is an integer equal to or less than 3, R' is hydrogen, alkyl, aryl, cycloalkyl, or araalkyl, cycloaryl, poly(alkylether), or the like, R'' is fluoroalkyl, fluoroaryl, fluorocycloalkyl, fluoroaralkyl, cycloaryl, polymeric, oligomeric, ionic, X is halide, and Z is carboxylate, trifluoroacetate, or the like, may be mixed with the liquid carrier to form the nanoparticle modified fluid. Non-uniformly substituted carbonaceous nanoparticles may also be used in the nanoparticle modified fluid.

Also included in the invention are functionalized carbonaceous nanoparticles having the formula (II)

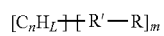  (II)

where n, L, m, R' and R have the same meaning as above. The carbon atoms, $C_n$, are surface carbons of a carbonaceous nanoparticle. In both uniformly and non-uniformly substituted carbonaceous nanoparticles, the surface atoms $C_n$ are reacted. Most carbon atoms in the surface layer of a carbonaceous nanoparticle are basal plane carbons. Basal plane carbons are relatively inert to chemical attack. At defect sites, where, for example, the graphitic plane fails to extend fully around the carbon nanotubes, there are carbon atoms analogous to the edge carbon atoms of a graphite plane. The edge carbons are reactive and must contain some heteroatom or group to satisfy carbon valency.

The substituted carbon nanotubes described above may advantageously be further functionalized. Such compositions include compositions of the formula (III)

  (III)

where the carbons are surface carbons of a carbonaceous nanoparticle, n, L and m are as described above, A is selected from OY, NHY, —$CR'_2$—OY, N'Y, C'Y,

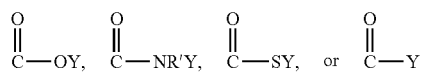

wherein Y is an appropriate functional group and is selected from R'OH, $R'NH_2$, R'SH, R'CHO, R'CN, R'X, $R'SiR'_3$, RSi—$(OR')_y$—$R'_{(3-y)}$, R'Si—(O—$SiR'_2$)—OR', R'—R'', R'—N—CO, $(C_2H_4$ $O)_w$—Y, —$(C_3H_6O)_w$—H, —$(C_2H_4$ $O)_w$—R', —$(C_3H_6O)_w$—R' and R', wherein w is an integer greater than one and less than 200.

The functional carbonaceous nanoparticles of structure (II) may also be functionalized to produce compositions having the formula (IV)

  (IV)

where n, L, m, R' and A are as defined above. The carbon atoms, $C_n$, are surface carbons of the carbonaceous nanoparticles.

The compositions of the invention also include carbonaceous nanoparticles upon which certain cyclic compounds are adsorbed. These include compositions of matter of the formula (V)

  (V)

where n is an integer, L is a number less than 0.1n, m is less than 0.5n, a is zero or a number less than 10, X is a polymeric moiety and R is as recited above. In one embodiment, the polymeric moiety is a polynuclear aromatic, polyheteronuclear aromatic or metallopolyheteronuclear aromatic moiety. Preferred cyclic compounds are planar macrocycles as described on p. 76 of Cotton and Wilkinson, Advanced Organic Chemistry. More preferred cyclic compounds for adsorption are porphyrins and phthalocyanines Exemplary polymeric moieties X in the formula (V) above and (VI) below are polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxanes, or the like, or a combination comprising at least one of the foregoing polymeric moieties.

The adsorbed cyclic compounds may be functionalized. Such compositions include compounds of the formula (VI)

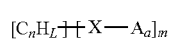
(VI)

where m, n, L, a, X and A are as defined above and the carbons are on the carbonaceous nanoparticles.

The functional groups detailed above for the carbonaceous nanoparticles can also covalently bonded to the metal oxide nanoparticles and to the metal coated carbonaceous nanoparticles.

Functionalized POSS may be prepared, for example, by corner-capping an incompletely condensed POSS containing trisilanol groups with a substituted trichlorosilane. For example, the trisilanol functionality of $R_7T_4D_3(OH)_3$ (wherein R is a hydrocarbon group) can be reacted with $Cl_3Si$—Y to produce the fully condensed POSS monomer $R_7T_8Y$. Through variation of the Y group on the silane, a variety of functional groups can be placed off the corner of the POSS framework, including but not limited to halide, alcohol, amine, carboxylate, isocyanate, acid, acid chloride, silanols, silane, acrylate, methacrylate, olefin, and epoxide.

Preferred functional groups are epoxies, esters and acrylate (—X—OC(O)CH=$CH_2$) and methacrylate (—X—OC(O) CH($CH_3$)=$CH_2$) groups, wherein X is a divalent linking group having 1 to about 36 carbons, such as methylene, ethylene, propylene, isopropylene, butylene, isobutylene, phenylene, and the like. X may also be substituted with functional groups such as ether (e.g., —$CH_2CH_2OCH_2CH_2$—), as long as such functional groups do not interfere with formation or use of the POSS. In one embodiment, X may be one or more of the aforementioned polymers. One, all, or an intermediate number of the covalently bound groups may be acrylate or methacrylate groups. Such functionalized POSS are available from Gelest, Inc. (Tullytown, Pa.) and Hybrid Plastics. A methacryloxypropyl-substituted $T_8$ POSS (wherein all positions of the polyhedron are methacryloxypropyl-substituted) is available under the trade designation MA0735 from Hybrid Plastics Corp.). Another methacryloxypropyl-substituted $T_8$ POSS (wherein one position is methacryloxypropyl-substituted and the remaining positions are isobutyl-substituted) is available under the trade designation MA0702 from Hybrid Plastics Corp (Fountain Valley, Calif.).

The linking groups X may also be functionalized with other functional groups. Other POSS fillers include, for example $T_6$, $T_8$, $T_{10}$, or $T_{12}$ structures functionalized with alkoxysilanes such as diethoxymethylsilylethyl, diethoxymethylsilylpropyl, ethoxydimethylsilylethyl, ethoxydimethylsilylpropyl, triethoxysilylethyl, and the like; with styrene, such as styrenyl ($C_6H_5$ CH=CH—), styryl (—$C_6H_4CH$=$CH_2$) and the like; with olefins such as allyl, —OSi($CH_3$)$_2CH_2CH_2$=$CH_2$, cyclohexenylethyl, —OSi($CH_3$)$_2$CH=$CH_2$ and the like; with epoxies, such as 4-propyl-1,2-epoxycyclohexyl, 3-propoxy, glycidyl (—$CH_2CH_2CH_2OCH_2CH(O)CH_2$), and the like; with chlorosilanes such as chlorosilylethyl, dichlorosilylethyl, trichlorosilylethyl, and the like; with amines such as aminopropyl, aminoethylaminopropyl, and the like; with alcohols and phenols such as —OSi($CH_3$)$_2CH_2CH_2CH_2OC(CH_2CH_3)_2$ ($CH_2CH_2OH$), 4-propylene-trans-1,2-cyclohexanediol, —$CH_2CH_2CH_2OCH_2C(CH_2OH)(OH)$, and the like; with phosphines such as diphenylphosphinoethyl, diphenylphosphinopropyl, and the like; with norbornenyls such as norbornenylethyl; with nitriles such as cyanoethyl, cyanopropyl, —OSi($CH_3$)$_2CH_2CH_2CH_2CN$, and the like; with isocyanates such as isocyanatopropyl, —OSi($CH_3$)$_2$ $CH_2CH_2CH_2NCO$, and the like, with halides such as 3-chloropropyl, chlorobenzyl (—$C_6$ $H_4CH_2Cl$), chlorobenzylethyl, 4-chlorophenyl, trifluoropropyl (including a $T_8$ cube with eight trifluoropropyl substitutions) and the like; and with esters, such as ethyl undecanoat-1-yl and methyl propionat-1-yl, and the like. Certain polymers such as poly(dimethyl-comethylhydrido-co-methylpropyl polymers, poly(dimethyl-comethylvinyl-co-methylethylsiloxy, poly(ethylnorbonenyl-co-norbonene) and poly(ethylsilsesquioxane) may also be used to functionalize POSS. Many of these substitutions are commercially available on $T_8$ POSS from Hybrid Plastics.

As noted above, the nanoparticle modified fluid may comprise "unexfoliated graphite" nanoparticles or exfoliated nanoparticles. Unexfoliated graphite as used herein represents natural or synthetic graphite, which may be crystalline or amorphous. The term "flexible graphite" as used herein represents the exfoliated reaction product of rapidly heated natural graphite nanoparticles that have been treated with an agent that intercalates into the crystal-structure of the graphite to expand the intercalated particles at least 80 or more times in the direction perpendicular to the carbon layers in the crystal structure. The process of intercalation is described below. Upon exposure to activation temperatures, the nanoparticles of intercalated graphite expand in dimension by as much as about 80 to about 1,000 times the original volume in an accordion-like fashion, i.e., in the direction perpendicular to the crystalline planes of the constituent graphite particles. These expanded nanoparticles of graphite as defined above, are also known as exfoliated graphite or flexible graphite and are vermiform (wormlike) in appearance.

In one embodiment, the nanoparticle modified fluids comprise intercalated graphite nanoparticles. The graphite nanoparticles are intercalated prior to functionalizing with the aforementioned functional groups. The term "intercalated graphite" as used herein represents graphite, which has been intercalated in the presence of, for example, an oxidizing agent as further described below. In the method of making intercalated graphite, natural graphite flakes are intercalated by dispersing the flakes in a solution containing an oxidizing agent. Suitable oxidizing agents include but are not limited to nitric acid, potassium chlorate, chromic acid, potassium permanganate, potassium chromate, potassium dichromate, perchloric acid, and the like, and combinations comprising at least one of the foregoing oxidizing agents. A preferred intercalating solution is one wherein an oxidizing agent, e.g., nitric acid, perchloric acid, chromic acid, potassium permanganate, hydrogen peroxide, iodic or periodic acids, is dissolved in either a sulfuric acid, or a solution of sulfuric acid with phosphoric acid. Although less preferred, the intercalation solution may also contain metal halides such as ferric chlorides, bromides, iodides, fluorides, and the like. Other suitable intercalants for graphite are water, potassium, rubidium, cesium, lithium, bromine and the like. After the flakes are intercalated with the intercalating solution, excess solution is drained from the flakes. The wet flakes are then washed with water and dried. The thus treated flakes of graphite are referred to as "intercalated graphite". As detailed above, the intercalated graphite may be heated to form exfoliated graphite. The intercalated graphite, the exfoliated graphite, and the intercalated exfoliated graphite may be functionalized as detailed above.

In one embodiment, the functional groups may be covalently or ionically bonded with the nanoparticles by reacting the nanoparticles directly with molecules that contain the functional groups. In another embodiment, the nanoparticles may first be treated with a strong acid or base to produce reactive groups on the surface that can be reacted with molecules that contain the functional groups. In yet another embodiment, the nanoparticles may be irradiated with electrons, neutrons, ions or xrays to produce reactive groups on the surface. The nanoparticles thus irradiated can then be reacted with molecules that contain functional groups to produce the surface modified nanoparticles. In one embodiment, the irradiated nanoparticles may be directly used in nanoparticle modified fluids without any further reacting them with molecules that contain functional groups. An exemplary functionalized nanoparticle that is added to the nanoparticle modified fluid is graphene oxide.

In one embodiment, one or more functional groups can be covalently or ionically bonded to the nanoparticles. By controlling the type and concentration of the functional groups that are bonded to the nanoparticles, the viscosity and surfactancy characteristics of the nanoparticle modified fluid can be controlled.

Another exemplary surface modified nanoparticle for use in the nanoparticle modified fluid are carbon nanotubes, fullerenes or graphenes that are functionalized with molecules that contain carboxylate functionalities, amine functionalities, amide functionalities, polymeric, oligomeric, ionic groups or a combination thereof.

In one embodiment the nanoparticle modified fluids may comprise the surface modified nanoparticles in an amount of about 0.1 to about 10 wt %, specifically about 0.2 to about 5 wt %, and more specifically about 0.3 to about 3 wt %, based on the total weight of the nanoparticle modified fluids.

The surface modified nanoparticles have a number of advantages. In one embodiment, when the surface modified nanoparticles are added to the liquid carrier, they can undergo dispersion in the liquid carrier and increase the viscosity of the liquid carrier. The nanoparticle modified fluid can be designed so that when it contacts a region of higher permeability it promotes gelation of the fluid in the vicinity of the high permeability zone thus plugging up the zone. This permits channeling of the injection fluid into less permeable zones.

The nanoparticle modified fluid when pumped into the subterranean hydrocarbon formation can also generate unique capillary forces that facilitate enhanced oil recovery.

The nanoparticle modified fluids display interesting viscosity properties. The nanoparticle modified fluids containing about 0.1 to about 2 wt %, specifically about 0.2 to about 1 wt % of the surface modified nanoparticles display a viscosity increase of about 2 to about 6, specifically about 3 to about 5 orders of magnitude when the shear rate is decreased from 1,000 seconds$^{-1}$ to 0.1 second$^{-1}$. The fluid is thus capable of behaving like a gel (without actually undergoing a reaction) when the shear rate is very low and can flow when the shear rate is increased.

The nanoparticle modified fluids may be exemplified by the following example.

EXAMPLE

Example 1

This example was conducted to demonstrate the manufacturing of a nanoparticle modified fluid that contains graphene oxide as the surface modified nanoparticle and deionized water (DI water) as the liquid carrier. Graphite particles having a basal diameter of 5 micrometers were modified to form the graphene oxide as detailed below.

Graphite platelets commercially available from XG Sciences were pre-dried overnight at 95° C. Commercially available concentrated sulfuric acid ($H_2SO_4$), potassium persulfate ($K_2S_2O_8$), phosphorous pentoxide ($P_2O_5$), potassium permanganate ($KMnO_4$), 30 wt % hydrogen peroxide ($H_2O_2$), and 10 wt % HCl, were used in the conversion of the graphite platelets to graphene oxide platelets.

A 250 milliliter three necked-round bottom (RB) flask is used with a stir bar. The pre-dried graphite powder (1.5 gms) is put into an 80° C. solution of concentrated $H_2SO_4$, $K_2S_2O_8$ (1.25 g) and $P_2O_5$ (1.25 g). The mixture is kept at 80° C. for 4.5 hours using a hotplate. The mixture is then cooled to room temperature and diluted with 250 mL of DI water and left overnight. It is then filtered and washed with DI water using a 0.2 μm nylon millipore filter to remove residual acid. The product is dried overnight under ambient conditions.

Pretreated graphite powder is put into cold concentrated $H_2SO_4$ (60 mL). Then, $KMnO_4$ is gradually added under stirring and the temperature of the mixture is kept below 20° C. by cooling. Successively, the mixture is stirred at 35° C. for 2 hours and then diluted with DI water. Since the addition of water into concentrated $H_2SO_4$ releases large amount of heat, the addition of water is carried out in an ice bath to keep the temperature below 50° C. After addition of all the 125 milliliters of DI water, the mixture is stirred for 2 hours and then 350 milliliters of DI water is added. Then 10 mL of 30% $H_2O_2$ is added to the mixture and the color of the mixture changes to brilliant yellow along with bubbling. The mixture is filtered and washed with 10% HCl (500 milliliters) followed with DI water (500 milliliters). The graphene oxide shows extremely good dispersion in water (1 wt %). The energy dispersive analysis by xrays (EDAX) analysis shows 39 wt % oxygen in the functionalized material.

The graphene oxide particles were then dispersed in DI water in amounts of 0.002 wt %, 0.2 wt %, 0.5 wt % and 1 wt % to form the nanoparticle modified fluid. The as received graphite particles were then dispersed in the liquid carrier in amounts of 0.5 wt %. The particles were added to the brine at room temperature and stirred prior to testing their viscosity at different shear rates. The viscosity was measured in a Anton Paar viscometer. The results are shown in the FIG. 1. The FIG. 1 is a graph that measures viscosity in centipoise at different shear rates (in seconds$^{-1}$).

Nanoparticles modified by Baker Hughes were also added to the liquid carrier to produce another nanoparticle modified fluid. From the FIG. 1, it may be seen that the nanoparticle modified fluid containing the graphite particles has a different viscosity profile from the nanoparticle modified fluids that contain the graphene oxide particles. For example, it can be seen that as the weight percent of the graphene oxide in the brine is decreased the viscosity at a shear rate of 0.1 seconds$^{-1}$ is increased. This result is unexpected.

In addition, from the FIG. 1 it may be seen that as the shear rate is increased the viscosity of the respective nanoparticle modified fluids (that contain the different amounts of graphene oxide) converges to a value that is almost similar to that of the nanoparticle modified fluid that contains graphite. This result is unexpected.

From the FIG. 1, it may be seen that the decrease in viscosity from a low shear rate to a high shear rate indicates that the nanoparticle modified fluid is a shear thinning fluid.

From this figure it may also be concluded that as the shear rate is decreased the viscosity of the nanoparticle modified fluid increases. This increase in the viscosity permits the fluid to reach a gelled state as its flow rate is decreased when it is injected into a subterranean hydrocarbon formation. The increase in viscosity promotes plugging of the zone, which causes the fluid to flow to lesser plugged zones. In short, the nanoparticle modified fluid can be used to direct the flow of fluids in the subterranean hydrocarbon formation by controlling the rate at which the nanoparticle modified fluid is injected.

The nanoparticle modified fluid also has a tolerance for high temperatures and has a high thermal conductivity associated with the nanoparticles thus enabling high temperature operations in the subterranean formation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of using a nanoparticle modified fluid comprising:
    injecting into a subterranean hydrocarbon formation the nanoparticle modified fluid
    comprising first nanoparticles that are surface modified to increase a viscosity of the nanoparticle modified fluid and that have at least one dimension that is less than 100 nanometers and second nanoparticles that are surface modified to increase a viscosity of the nanoparticle modified fluid and that have at least one dimension that is less than 100 nanometers; the first nanoparticles being different from the second nanoparticles; the sum of the weight of the first and second nanoparticles being about 0.1 to about 2 wt. %, based on the total weight of the nanoparticle modified fluid, and the nanoparticle modified fluid displaying a viscosity increase of about 2 to about 6 orders of magnitude when the shear rate is decreased from 1,000 seconds$^{-1}$ to 0.1 second$^{-1}$;
    contacting the subterranean hydrocarbon formation with the nanoparticle modified fluid;
    plugging a first zone of the formation by reducing flow rate of the nanoparticle modified fluid and increasing the viscosity of the nanoparticle modified fluid to a point of gelation;
    channeling the nanoparticle modified fluid into a second zone of the formation; the second zone of the formation having a lower permeability than the first zone of the formation; and
    injecting additional nanoparticle modified fluid into channels formed in the gelled nanoparticle modified fluid in the subterranean hydrocarbon formation,
    wherein the first nanoparticles comprise carbonaceous nanoparticles, and the second nanoparticles comprise metal oxide nanoparticles, metal nanoparticles, polyhedral oligomeric silsesquioxane nanoparticles, clay nanoparticles, silica nanoparticles, boron nitride nanoparticles, or a combination comprising at least one of the foregoing nanoparticles.

2. The method of claim 1, where at least one of the first and second nanoparticles has a surface area of about 120 to about 2,000 square meters per gram.

3. The method of claim 1, where the carbonaceous nanoparticles comprise carbon nanotubes, graphite nanoparticles, graphene nanoparticles, fullerenes, or a combination comprising at least one of the foregoing carbonaceous nanoparticles.

4. The method of claim 1, where at least one of the first and second nanoparticles comprises spherical or ellipsoidal nanoparticles, nanorods, nanotubes, nanowhiskers, nanoribbons, nanosheets, nanoplatelets, or a combination comprising at least one of the foregoing nanoparticles.

5. The method of claim 1, where at least one of the first and second nanoparticles has an aspect ratio greater than 5.

6. The method of claim 1, where the metal oxide nanoparticles comprise zinc oxide nanoribbons, tin dioxide nanoribbons, indium (III) oxide nanowires, cadmium oxide nanoribbons, gallium (III) oxide nanoribbons, tungsten oxide nanowires, titanium dioxide nanotubes, silicon dioxide spherical or ellipsoidal nanoparticles, aluminum oxide spherical or ellipsoidal nanoparticles, zirconium oxide spherical or ellipsoidal nanoparticles, titanium dioxide spherical or ellipsoidal nanoparticles, or a combination comprising at least one of the foregoing metal oxide nanoparticles.

7. The method of claim 1, where at least one of the first and second nanoparticles is modified with functional groups that facilitate their dispersal in the liquid carrier and resist phase separation from the liquid carrier.

8. The method of claim 7, where the functional groups comprise carboxyl groups, amine groups, amide groups, polymers, oligomers, ionic groups or a combination comprising at least one of the foregoing functional groups.

9. The method of claim 1, where at least one of the first and second nanoparticles is modified with groups that are compatible with water.

10. The method of claim 1, wherein the nanoparticle modified fluid further comprises a liquid carrier comprising water.

11. The method of claim 10, wherein the liquid carrier further comprises a mutual solvent, the mutual solvent comprising:
    a substituted and unsubstituted glycol of the formula $R^1O(CH_2CHR^2O)_nR^3$, wherein $R^1$, $R^2$, and $R^3$ are independently hydrogen, alkyl group, aryl group, and acetyl group, and n is about 1 to about 10;
    an amide of the formula $R^4CONR^5R^6$, wherein $R^4$, $R^5$, and $R^6$ are independently a C1-C5 alkyl group or C1-C5 alkenyl group, and any two of $R^4$-$R^6$ can cyclize together to form a cycle;
    an alcohol; or a combination comprising at least one of the foregoing.

* * * * *